May 29, 1962   P. F. GRIEGER ET AL   3,037,066
SEALED STORAGE CELL AND CHARGING CIRCUITS THEREFOR
Filed Dec. 11, 1958   2 Sheets-Sheet 1

INVENTORS
PHILIP F. GRIEGER
HARRY G. V. EVANS, DECEASED
MARIE ESTELLE LANIER
ADMINISTRATRIX

BY *George H. Fritzinger*

AGENT

May 29, 1962 P. F. GRIEGER ET AL 3,037,066
SEALED STORAGE CELL AND CHARGING CIRCUITS THEREFOR
Filed Dec. 11, 1958 2 Sheets-Sheet 2

INVENTORS
PHILIP F. GRIEGER
HARRY G. V. EVANS, DECEASED
MARIE ESTELLE LANIER
ADMINISTRATRIX
BY George H. Fritzinger
AGENT United States Patent Office 3,037,066
Patented May 29, 1962

3,037,066
SEALED STORAGE CELL AND CHARGING CIRCUITS THEREFOR
Philip F. Grieger, East Orange, N.J., and Harry G. V. Evans, deceased, late of Caldwell, N.J., by Marie Estelle Lanier, administratrix, Lethbridge, Alberta, Canada, assignors, by mesne assignments, to The Electric Storage Battery Company, Philadelphia, Pa., a corporation of New Jersey
Filed Dec. 11, 1958, Ser. No. 779,787
8 Claims. (Cl. 136—6)

This invention relates to a novel form of sealed storage cell and to charging circuits therefor. Objects of the invention are to provide improved sealed storage cells having substantially longer life and better discharge capabilities than are had by the sealed storage cells heretofore known in the art.

The storage cell of this invention employs preferably a positive electrode provided with nickel active material and a negative electrode provided with cadmium active material. The invention is carried out most effectively when the positive electrode comprises a porous sintered nickel plaque filled with a nickel active material of nickel oxide and hydroxide, and when the negative electrode comprises perforated plates as of nickel or nickel-plated metal joined to form pockets which pockets are filled with an active material described in the Moulton Patent No. 2,727,080, such active material comprising preferably a major percentage of pulverulent cadmium hydroxide mixed with a minor percentage of finely divided metallic iron and ferrous oxide to which is added about 1% latex on a cadmium metal basis. The cadmium hydroxide is itself preferably made simply by mixing water with cadmium oxide to form a thin wet slurry, and then slowly oven drying at about 95° C. and screening the dried product, as described in the pending Moulton application Serial No. 766,719, filed October 13, 1958.

The present negative electrodes operate particularly effectively for the purposes of the present invention when they are given a long overcharge and then discharged before the cell is sealed. A feature of the invention is in using a free-flowing liquid alkaline electrolyte in a sealed cell employing these negative electrodes.

When a sealed cell uses a free-flowing liquid electrolyte, as against the use in the semi-dry constructions of only such electrolyte as can be contained by absorption in the porous insulating separators between the electrodes, there is assured an ample supply of electrolyte in effective association with the entire masses of the electrode active materials to provide a greater efficiency of cell operation. Still further, a liquid alkaline electrolyte is especially effective in connection with the aforementioned cadmium active material in obtaining long cell life under deep cycling, the term "deep cycling" being herein used to mean that the cell is nearly completely discharged on each charge-discharge cycle.

A further object of the invention is therefore to provide a novel form of sealed storage cell which has a long life, as of the order of a thousand or more cycles, under deep cycle service conditions.

In order that the present cell will have a maximum capacity and the ability also to be discharged at maximum rates, the active portions of the electrodes are completely submerged in the electrolyte during service discharge of the cell. However, in order to enable the evolved oxygen gas from the positive electrode to recombine with the negative active material during charging, an active portion of a negative electrode of the cell is placed in contact with the gas space during charging. This is achieved in a novel manner by the present invention by so physically disposing the electrodes in the cell container and so adjusting the electrolyte level that when the cell is positioned horizontally for charging, an outer active face of a negative electrode will be in contact with the gas space while the remaining portion of this electrode as well as the active portions of all other electrodes will be completely submerged. This novel construction is permitted because, when the active portion of a cadmium electrode, whether the sole electrode or one of several such electrodes of the cell, is partly submerged it will combine with the oxygen gas at a fast rate both while being charged and discharged—i.e., while being electro-chemically reduced and electrochemically oxidized—as well as on open-circuit stand so long as the electrode is at least in a partly charged state. Further, when the special cadmium active material hereinbefore described is used, it will combine with oxygen gas at a still appreciable rate even after it has been extensively overdischarged. Contrary to what has been herebefore taught in the art, the life of such cadmium electrode is not adversely affected by charging the cell and allowing the electrode to react with oxygen while the electrode is partly submerged in the electrolyte.

The use of precharged positive electrodes having a lesser remaining charge capability than the negative electrode, as taught in the pending application Serial No. 563,753 of Philip F. Grieger, is particularly beneficial in the present type of cell for preventing hydrogen evolution not only during overcharge but also during overdischarge as when a battery of individual cells are connected in series and the output of one of the cells becomes exhausted before the others. Also, special advantages are obtained by using the present cell with a pressure switch connected in the charging circuit to limit the charging of the cells to only such time as when the internal pressure is below a predetermined safe maximum value.

A further object of the invention is therefore to provide more efficient and longer-lived cells of sealed construction which are safeguarded against hydrogen evolution during charge and during service discharge whether used individually or in a battery of cells under conditions giving rise to possible overdischarge of the weaker cells.

These and other objects and features of the invention will be apparent from the following description and the appended claims.

In the description of the invention, reference is had to the accompanying drawings of which:

Figure 2:
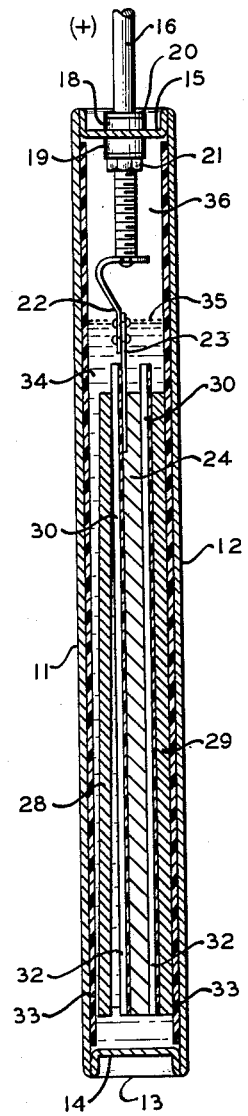
FIGURE 2 is a vertical cross sectional view of this cell.

The present cell may have a rectangular case 10 provided with parallel side walls 11 and 12 perpendicular to the bottom seating surface 13 thereof. The case may comprise a tubular member of nickel-plated steel rectangular in cross section, as shown, into the bottom and top of which are fitted flanged rectangular end walls 14 and 15 sealed thereto by welding the flanges to the inside surfaces of the tubular member. The upper end wall 15 is provided with clearance holes for respective positive and negative terminal posts 16 and 17, which are hermetically sealed to the end wall as with the use of outer and inner rubber grommets 18 and 19 clamped under pressure between outer flanges 20 on the posts and nuts 21 threaded on the internal portions thereof, as shown in FIGURE 2. The positive post is staked at its inner end to a terminal connector 22 which is in turn riveted to a terminal lug 23 upstanding from the positive electrode 24, and the negative post 17 is staked to a U-shaped terminal connector 25 the opposite depending legs of which are riveted to terminal lugs 26 and 27 of respective negative electrodes 28 and 29.

The electrodes are provided preferably in plate form, in view of which they are herein ofttimes referred to as the positive and negative plates. As beforementioned, the positive plate is preferably a porous sintered plaque as of nickel charged with a nickel active material principally of nickel oxide, and the negative plates are preferably of the pocket type filled with a cadmium active material. Specifically, the cadmium active material may comprise one part of active iron material (itself comprising equal parts of finely divided metallic iron and ferrous oxide) mixed with ten parts by weight of cadmium hydroxide prepared by anodic electrolysis of cadmium metal in an aqueous alkaline electrolyte. Into this cadmium active material there is mixed approximately 1% latex on a cadmium metal basis. For further details reference may be had to the aforementioned Moulton patent.

Figure 1:
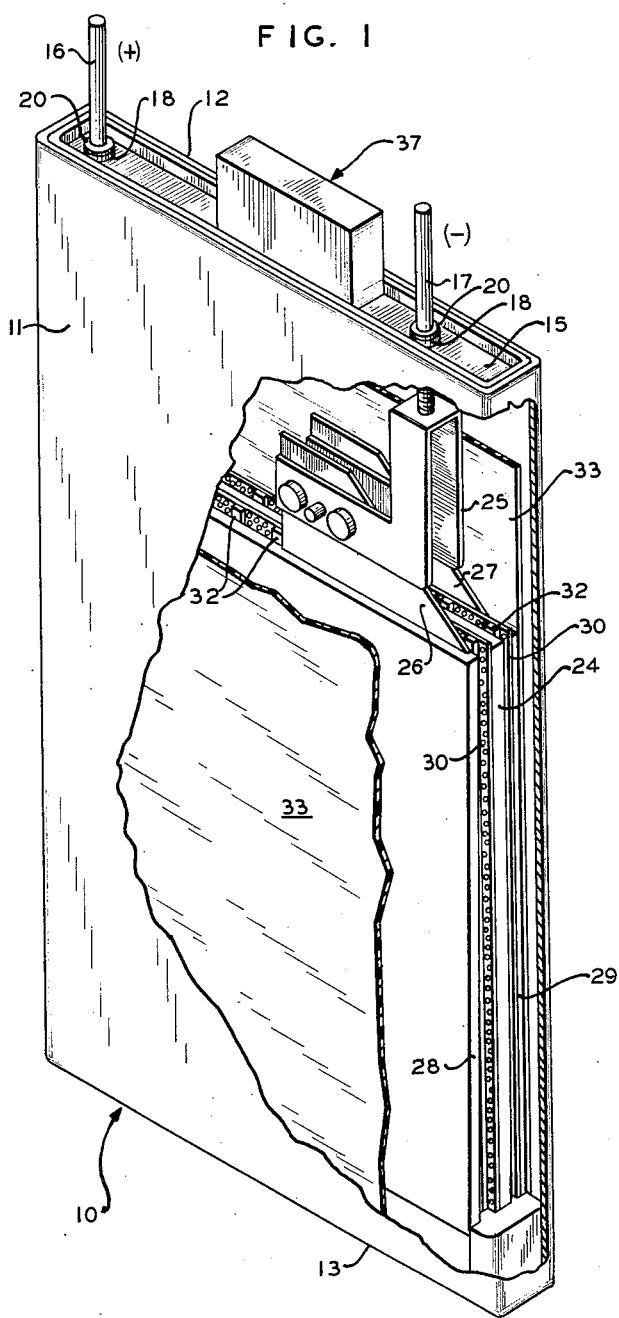
FIGURE 1 is a perspective view, with the housing partly broken away, of a preferred form of cell embodying the present invention.

The central positive plate 24 and the two side negative plates 28 and 29 are assembled in a stack arrangement with intervening separators 30. It is preferred in the present case that each separator hold the adjacent positive and negative plates apart while occupying as little of the space between them as possible. Only by way of example, each separator may comprise a highly perforated sheet as of polystyrene, Lucite, polyvinylchloride, etc., which is ribbed on one side as by gluing polystyrene rods 32 to the plates at regular space intervals. The separators are so positioned that when the cell is standing upright on its bottom seating surface 13 the spacing rods will stand vertically as shown in FIGURE 1. The case 10 may be lined internally with an insulating sheeting 33 such as of polystyrene or hard rubber, but alternatively the negative plates may be electrically connected to the side walls of the case and the case may then be insulated externally.

The case is partially filled with liquid alkaline electrolyte 34 to a level 35 above the active portions of the positive and negative plates but still suitably below the top of the case to provide an upper gas space 36 therein. The electrolyte is preferably a 20% to 30% potassium hydroxide solution in water containing up to about 24 grams of lithium hydroxide per liter. The lithium hydroxide is beneficial in delaying the onset of rapid oxygen evolution from the positive plate during charge and in causing the positive electrode to have a more nearly ideal performance, which would be a performance where during charge all the electricity passing through the electrode goes into the oxidation of nickelous hydroxide until the process is complete and then all electricity passing through the electrode goes into a liberation of oxygen gas.

The cell of the present invention is to be placed on its side to expose an outer face of one of the negative electrodes to the gas space in the cell when the cell is to be charged. For this purpose the cell could be laid on either side 11 or 12 of the case, in which event the plate separator assembly would be located midway between the two side walls of the case with a suitable spacing at each side. However, it is preferred that the cell be laid always on one particular side, for example the side 12, when it is to be charged. Accordingly, the plate separator assembly is mounted flat against the side wall 12, with its negative plate 29 separated from the side wall of the case only by the insulating sheet 33. The distance of spacing of the other negative plate 28 from the other side wall 1 is set so that when the cell is laid on its side 12 the negative plate 28 will be partly submerged and partly exposed to the gas space then at the top of the case adjacent the side wall 11. In order to relieve criticalness of adjustment of the electrolyte level the negative plate 28 may be inclined slightly to the side wall 12 as shown in FIGURE 2. As a further or alternative measure, the cell as a whole may be tilted slightly with the horizontal when it is laid on its side for charging, it being understood that the term "horizontal positioning" as herein used is meant to include slight inclinations of the whole cell with the horizontal. A slight tilt of the whole cell has the advantage of permitting easier escape of bubbles of gas from beneath the plates submerged in the electrolyte.

Although, theoretically, the negative electrode should be fully immersed for most efficient charging and should be fully exposed to the oxygen gas space for most efficient recombination a satisfactory compromise is attained, without substantial loss in efficiency in either respect, by having the active portion of the negative plate approximately half submerged when the cell is laid on its side. When a relatively thin negative plate is used, as is here the case, an approximately 50% submersion is accomplished so long as the outer face of the negative plate is exposed to the gas space and the inner face is covered with electrolyte.

During charging in general the positive electrode evolves oxygen gas at a slow rate, but this rate increases rapidly as the electrode becomes nearly fully charged, ultimately reaching a rate where the oxygen equivalent in amperes equals approximately the charging current. The evolved oxygen gas however combines readily with any exposed portion of a negative electrode in contact with the electrolyte, the effect of such combination being to discharge the negative electrode. The negative electrodes would evolve hydrogen gas if it were nearly fully charged or overcharged but since hydrogen gas is difficultly reactable with the active material of the positive electrode, sealed cell constructions are designed so as to prevent the negative electrode from ever being fully charged. The positive electrode would also evolve hydrogen gas were it ever overdischarged—i.e., were a discharging current passed through the cell after the positive electrode had reached the end of its output, which would happen were a battery of cells discharged in series with one of the cells being substantially weaker than the others. However, in accordance with the teaching of the pending Grieger application aforementioned, such possible evolution of hydrogen gas from the positive electrode during overdischarge and from the negative electrode during overcharge is avoided by precharging the positive electrode before the cell is sealed and by adjusting the relative capacities of the electrodes so that the positive electrode has a lesser remaining charge capability than the negative electrode. It is particularly desirable when cells of the present invention are used in series arrangement that they have both a positive precharge and a lesser positive charge capability; however, if the cells are to be used individually then overdischarge is not a possibility and a positive precharge is not necessary. In any event the hydrogen free charging capability of the negative electrode should always be greater than the saturation charging capability of the positive electrode at least by the number of ampere hours in equivalent oxygen evolution to be present in the cell at any one time. The positive precharge in each cell when cells are discharged in series is made large enough to assure that only the negative electrodes can ever become overdischarged.

Upon overdischarging a negative electrode the same evolves oxygen gas but this evolution is not detrimental, notwithstanding that the evolved oxygen gas cannot then recombine with the electrodes but will accumulate in the cell, since this evolved oxygen gas will readily recombine with the negative electrode during the next charge. In view of this later recombination there is no net change in the positive precharge after each charge-discharge cycle of the cell. In order to avoid an excessive oxygen pressure in any one cell resulting from overdischarge thereof when a group of cells are discharged in series, the greatest difference in ampere hour outputs between the cells is specified to be less than the maximum amount of oxygen in equivalent ampere hours which can safely be contained in the respective cells.

The present cells can be charged continuously at constant current even after they reach a fully charged state so long as the charging current does not exceed the equivalent rate at which oxygen can react with the partially exposed negative electrode when the cell is on its side. Since the rate at which the evolved oxygen can react with the partially exposed negative electrode is nearly proportional to the oxygen partial pressure in the cell, the maximum continuous charging current at which a cell can be safely charged depends on the maximum pressure the cell walls can stand. The charging of a series of the cells at constant voltage is not satisfactory because there will occur uneven potential drops across the individual cells causing some to be overcharged more than others with resultant excess evolution of oxygen gas and possible resultant damage to the cells.

In order that the cells may be charged safely at high current rates as well as by poorly regulated currents either individually or in series arrangements, each cell is preferably provided with a pressure switch 37. Such pressure switch may be of any suitable construction comprising for example a diaphragm as of Teflon (not shown) sealed over an aperture in the end wall 15 and responsive to variable pressure in the cell to operate a single-pole double-throw microswitch. The pressure switch is set to operate when the internal pressure increases above a predetermined maximum limit typically at about a gauge pressure of 1 atmosphere. In its normal position shown in FIGURE 3, the pressure switch connects the battery terminals to a circuit 38 which may be both a charge and discharge circuit. When the internal pressure rises above the predetermined limit the switch operates to disconnect the cell from the circuit 38 but at the same time to maintain continuity of the circuit through the jumper 39. Oxygen will continue to react with the top negative plate 28 after the cell is so disconnected, and when the internal pressure has fallen to a predetermined lower limit of about a gauge pressure of .8 atmosphere the pressure switch is returned to normal position to reconnect the cell to the circuit 38. Charging will then be resumed until the internal pressure again reaches the 1 atmosphere gauge pressure limit.

If the pressure switch is operated by build up of internal pressure at the end of a charge cycle a period of standby, with the cell on its side, is necessary before the internal pressure would fall sufficiently to restore the pressure switch to its normal position. If the pressure switch is operated by overdischarging the cell then such period of standby is longer because oxygen is more difficultly combinable with the negative active material when the negative electrode is in overdischarged state.

Figure 3:
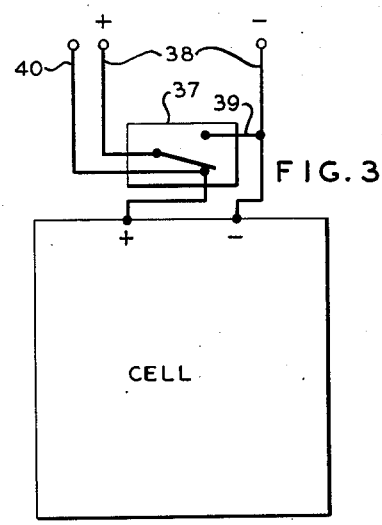
FIGURES 3 and 4 are schematic diagrams illustrating preferred charging circuits for the present cell.

The cell may, of course, be discharged independently of its internal pressure at any time by direct connections to the cell terminals through a lead 40 and one of the leads 38 as shown in FIGURE 3.

Figure 4:
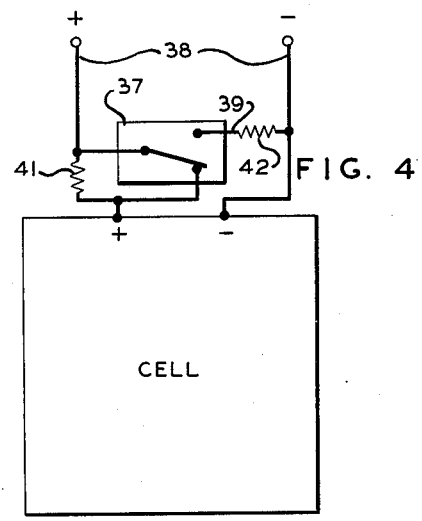

The charging circuit of FIGURE 4 differs from that of FIGURE 3 in that a resistor 41 is connected permanently across the normal contacts of the pressure switch and a resistor 42 is connected serially in the jumper line 39. This modification is adapted to overcome the long period of standby necessary when the cell has been overdischarged before the cell can be charged. In this modified circuit a small charge current will flow immediately as soon as the circuit 38 is connected to a charge source, the amount of the charging current depending upon the relative values of the resistors 41 and 42. The negative electrode will thus soon acquire enough charge to make its reaction with oxygen sufficiently rapid to cause the internal pressure to fall soon to the .8 gauge- pressure level at which the pressure switch is returned to normal position to allow charging at the full rate to begin. During normal charging the pressure at first falls fast, but as the cell approaches full charge the internal pressure builds up to operate the pressure switch. When the pressure switch is operated at the end of charge, a charging current will continue to flow through the resistor 41, but the resistors 41 and 42 are so chosen that the charging current will not give rise to oxygen evolution at a faster rate than the oxygen can recombine with the negative electrode.

Figure 5:
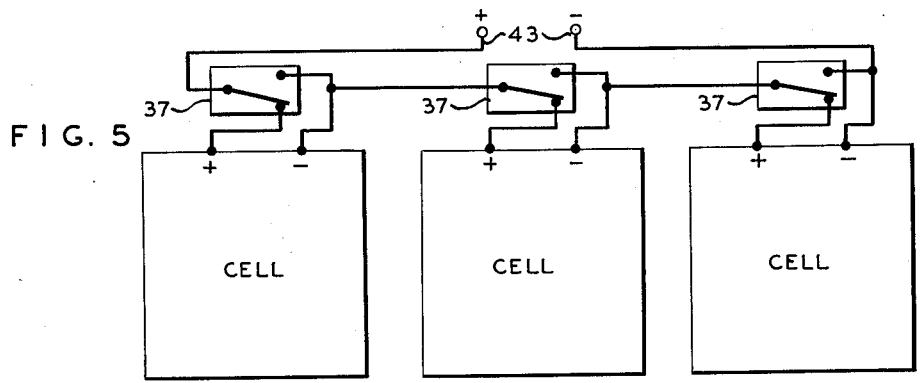
FIGURES 5 and 6 are schematic diagrams illustrating charging circuits for batteries of the present cells.

In FIGURE 5 there is shown a charge-discharge circuit 43 for a group of cells connected in series where each cell has a charge-discharge circuit as shown in FIGURE 3. In this arrangement each cell, is in effect, charged individually because whenever pressure builds up in any one cell to the preset value its pressure switch cuts the cell out of the circuit. The pressure switches in this arrangement afford complete protection against damage to the cells from over-discharge because when any one cell reaches the end of its output any continuing discharge will soon cause the cell to be removed from the discharge circuit. As a result, the outputs of the cells connected in series need not be matched.

Figure 6:
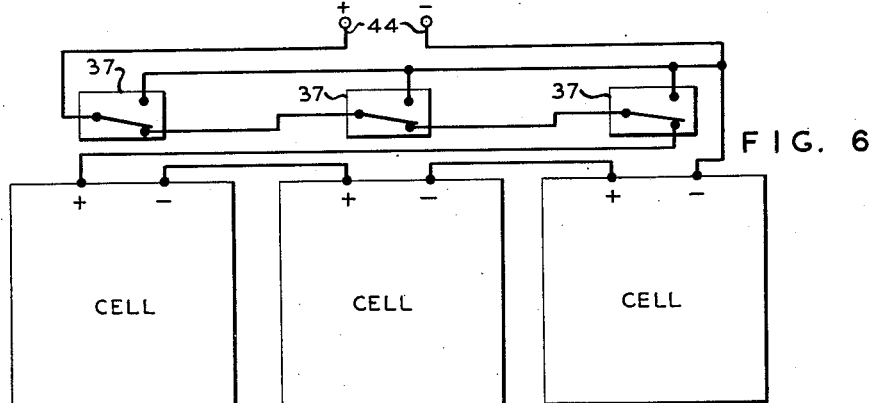

In FIGURE 6 there is shown a charge-discharge circuit 44 for a group of cells connected in series where operation of the pressure switch of any one cell will remove all the cells from the circuit. In this arrangement the cells are, in effect, charged collectively. The cells here receive the same input and at the end of charge their charge contents are substantially the same. Since the outputs of the cells are substantially the same, all of the cells will become fully discharged at about the same time without any cell evolving sufficient gas to operate the respective pressure switch. This has the advantage that there is not required any waiting period after discharge for restoration of the pressure switches, permitting therefore the cells to be charged immediately after the end of discharge.

By way of example, each cell as shown in FIGURE 1 may have the following characteristics: the center positive plate 24 of each cell may be .130" thick, 4.7" wide and 4.9" high; the negative plates 28 and 29 of each cell may be .080" thick, 4.7" wide and 4.9" high and may have 9 strip pockets filled with cadmium active material. The separators need only be thick enough to assure against adjacent plates becoming shorted, but are to be suitably ribbed and perforated so as not to entrap oxygen gas bubbles when the cell is on its side. A cell of this construction, using a 20% potassium hydroxide solution containing 24 grams of lithium hydroxide per liter, will when charged in a horizontal position at 2 amperes accept 13.8 ampere hours and will when discharged at 2 amperes to a cell potential of 1 volt have an output of 11.4 ampere hours.

The particular embodiment of our invention herein shown and described is intended to be illustrative and not necessarily limitative of our invention since the same is subject to changes and modifications without departure from the scope of our invention, which we endeavor to set forth according to the following claims:

We claim:

1. A storage cell comprising a permanently sealed case having a bottom side for seating the cell in an upright position for service discharge and a flat side for seating the cell in a horizontal position for charge, a liquid alkaline electrolyte in said case, at least one negative electrode and one positive electrode in said case, said positive electrode having an active material evolving oxygen gas during overcharge and said negative electrode having an active material capable of recombining with oxygen gas contacting the same, said cell having its electrodes spaced from the top wall of said case and having one negative electrode next adjacent to and spaced from a side wall of said case, and said electrolyte being at a level in said case to cover fully the active portions of all of said electrodes while leaving a gas space in the top of said case when the cell is in said upright position, and to cover all of said electrodes except said one negative electrode and to cover only partially said one negative electrode while leaving an active surface of the electrode in contact with said gas space when said cell is in said horizontal position.

2. A storage cell comprising a permanently sealed case having a bottom side for seating the cell in an upright position for service discharge and a flat side for seating the cell in a horizontal position for charge, a free-flowing liquid alkaline electrolyte in said case, at least one negative plate and one positive plate in said case spaced from each other and disposed vertically in a lower portion of said case with said negative plate being next adjacent to the wall opposite said flat side of the case and substantially parallel to said flat side, said electrolyte covering fully the active portions of said plates while leaving a gas space in the top of said case when the cell is in said upright position, and said one negative plate being spaced from said flat side of the case at a distance causing the outer surface of the negative plate to contact the gas space in the case and the inner surface of the negative plate and said positive electrode to be submerged in the electrolyte when the cell is seated on said flat side of the case for charge.

3. The storage cell set forth in claim 2 wherein said one negative plate is in a slanting position with respect to said flat side of the case.

4. A storage cell having a permanently sealed case, at least one negative electrode comprising cadmium active material and one positive electrode comprising nickel active material, said electrodes being spaced from the top of said case and at least one negative electrode being next adjacent to and spaced from a side wall of the case, and a free-flowing liquid electrolyte of potassium hydroxide containing lithium hydroxide, said electrolyte being at a level covering fully the active portions of said electrodes to allow a discharge thereof at maximum rates when the cell is seated upright, said electrolyte level being at a distance from the top of the case to provide a gas space therein, and the distance of spacing of said one negative electrode from said side wall of the case being such that a side face of said negative electrode will contact said gas space and the opposite face of the negative electrode will contact said electrolyte with full submersion of the positive electrode when the cell is laid in a horizontal position on a side wall of the case opposite said aforestated side wall thereof.

5. A battery comprising a series of storage cells each as set forth in claim 4, wherein the positive electrode of each cell has an initial state of charge higher than that of the negative electrode and has a lesser charge capability than that of the negative electrode when the cell is sealed.

6. The battery set forth in claim 5 wherein the greatest difference in ampere hour output between said cells is less than the maximum amount of oxygen gas in ampere hours that can safely be contained in the respective cells.

7. A storage battery comprising a group of cells each as set forth in claim 4, wherein the negative electrode of each cell has a hydrogen-free charging capability greater than the saturation charging capability of the positive electrode by an amount at least as great as the number of ampere hours of oxygen gas present in the cell when the cell is charged to the fullest extent.

8. A storage cell having a sealed rectangular case provided with flat parallel side walls, a stack comprising one central positive plate and two side negative plates in said case spaced from the top thereof and in substantially parallel relation to the side walls thereof, at least one of said side negative plates being in spaced relation to the adjacent side wall of the case, said positive plate comprising a porous sintered plaque containing nickel active material and said negative plates comprising plate-like frames of perforated metal having pockets containing cadmium active material, perforated insulated sheets between said negative and positive plates, each of said sheets being provided with spacing ribs on one side thereof, and an alkaline liquid electrolyte partially filling said cell to a level above said stack but short of the top end of the case whereby to provide a gas space in the top of the case when the cell is in upright position, said one negative side plate being spaced at a distance from said adjacent side wall of the case causing said one negative side plate to be partially submerged in the liquid electrolyte with its outer face in contact with said gas space when the cell is laid on its side opposite said adjacent side wall of the case and with full submersion of said other electrodes.

References Cited in the file of this patent
UNITED STATES PATENTS

| | | |
|---|---|---|
| 2,571,927 | Neumann et al. | Oct. 16, 1951 |
| 2,614,138 | Jacquier | Oct. 14, 1952 |
| 2,651,669 | Neumann | Sept. 8, 1953 |